US007315845B2

(12) United States Patent
Elliott

(10) Patent No.: US 7,315,845 B2
(45) Date of Patent: Jan. 1, 2008

(54) METHOD OF PRINTING STATEMENTS USING POSTAGE METER

(75) Inventor: James Neil Elliott, Chelmsford (GB)

(73) Assignee: Neopost Limited, Romford, Essex (GB)

( * ) Notice: Subject to any disclaimer, the term of this patent is extended or adjusted under 35 U.S.C. 154(b) by 1207 days.

(21) Appl. No.: 09/770,614

(22) Filed: Jan. 29, 2001

(65) Prior Publication Data

US 2004/0215583 A1 Oct. 28, 2004

(30) Foreign Application Priority Data

Jan. 29, 2000 (GB) ................................ 0001974.5

(51) Int. Cl.
*G06F 17/00* (2006.01)
*G07B 17/02* (2006.01)

(52) U.S. Cl. ...................................................... 705/408

(58) Field of Classification Search .................... 705/1, 705/400–410

See application file for complete search history.

(56) References Cited

U.S. PATENT DOCUMENTS 4,797,832 A * 1/1989 Axelrod et al. ............. 700/227
5,538,232 A * 7/1996 Long ......................... 270/1.03
5,617,519 A * 4/1997 Herbert ..................... 358/1.18
6,255,665 B1 * 7/2001 Elgee et al. ............. 250/559.4
7,124,117 B1 * 10/2006 Girardi et al. .............. 705/401
2002/0164454 A1 * 11/2002 Elgee et al. ................ 428/132

FOREIGN PATENT DOCUMENTS

EP A0447179 9/1991
EP A0762336 3/1997
EP A1001382 5/2000
GB A2188868 10/1987

* cited by examiner

*Primary Examiner*—John W. Hayes
*Assistant Examiner*—Fadey S. Jabr
(74) *Attorney, Agent, or Firm*—Shoemaker and Mattare

(57) ABSTRACT

A method of printing a report sheet using a printer of a postage meter in which the printer is capable of printing only in a print field smaller than required to print the report sheet and in which first and second edges of the sheet are required to be located at predetermined positions is described in which printing of the report sheet is effected in a sequence of printing operations and the report sheet is folded in such a manner as to permit an area thereof intended to receive an imprint in the print field of the printer.

5 Claims, 4 Drawing Sheets

METHOD OF PRINTING STATEMENTS USING POSTAGE METER

BACKGROUND OF THE INVENTION

This invention relates to printing statements using a postage meter and in particular to printing statements of mailing or other reports having dimensions larger than can be accommodated by a printing device of a postage meter.

Known postage meters are provided with a printer that is operated to print postal indicia on mail pieces in order to provide evidence that accounting for payment of postage charges in respect of the mail pieces has been carried out. In one kind of postage meter, the printer is a digital printer having a line of printing elements and, while the mail piece is held static in the postage meter, the print head is caused to traverse a print receiving area of the mail piece in which the postal indicium is to be printed. The line of printing elements extends in a direction transverse to the direction of traverse of the print head. The line of printing elements extends in the direction of the height of the imprint and hence the maximum height of any imprint printed by the printer is determined by the length of the line of printing elements. The required height of the postal indicia printed on the mail pieces is approximately 1 inch and the printer provided in the postage meter is capable only of printing an imprint having a height corresponding to that of the postal indicia. The direction of traverse of the print head corresponds to the width of the imprint and hence the maximum width of imprint that can be printer by the printer is determined by the extent of traverse of the print head. It is desirable that the postage meter is of compact construction and hence it desired that the extent of traverse of the print is only sufficient to enable printing of a postal indicium and, when desired, a slogan alongside the postal indicium.

When the postage meter is used for franking mail pieces a postal authority that is to handle the franked mail pieces may require the provision by the user of the postage meter of statements or reports in respect of a batch of mail or relating to a period of operation of the postage meter. The information required for such reports is stored in memory of the postage meter and it would be convenient to use the printer of the postage meter to print the reports. However such reports usually require the printing of a quantity of information that cannot be contained within an area having the limited operational printing area, corresponding to a postal inidiicum and slogan, of the printer of the postage meter.

A further difficulty in using the postage meter printer to print reports arises because operation of the printer needs to be initiated by a mail sensor which, when the postage meter is used for printing postal indicia on mail pieces, is activated by correctly locating a mail piece in the postage meter to receive a postal indicium imprint. The mail sensor includes an element that needs to be displaced by insertion of the mail piece into the required correct location in the postage meter. Mail pieces have sufficient rigidity to displace the element of the sensor but a sheet of relatively lightweight paper on which it is desired to print a report may have insufficient rigidity to displace the element of the sensor to activate the sensor.

SUMMARY OF THE INVENTION

According to one aspect of the invention a method of printing in an area of a sheet using a printer of a postage meter, said printer having a limited print field smaller than said area required to be printed on the sheet and in which two adjacent edges of the sheet are required to be located at predetermined first and second locations respectively relative to the print field comprises the steps in a first printing operation of positioning the sheet with a first edge thereof located at said first predetermined location and a second edge thereof located at said second predetermined location thereby locating a first print receiving sub-area of a first segment of the sheet in alignment with the print field and effecting printing in said first print receiving sub-area and removing the sheet from the postage meter; and the steps in a second printing operation of folding the sheet along a fold line extending between said first segment and a second segment adjacent to said first segment, positioning the sheet with the fold line located at said first predetermined location and the second edge located at the second predetermined location thereby locating a second print receiving sub-area of said second segment in alignment with the print field and effecting printing in said second print receiving sub-area.

According to a second aspect of the invention a report sheet for receiving imprints from a printer of a postage meter comprises at least first and second segments, said first and second segments being connected along a fold line, the sheet being foldable along said fold line to enable location in turn of each of said segments in alignment with a print field of the printer of the postage meter.

BRIEF DESCRIPTION OF THE DRAWING

An embodiment of the invention will be described hereinafter by way of example with reference to the drawings in which.

DESCRIPTION OF THE PREFERRED EMBODIMENT

Figure 1:
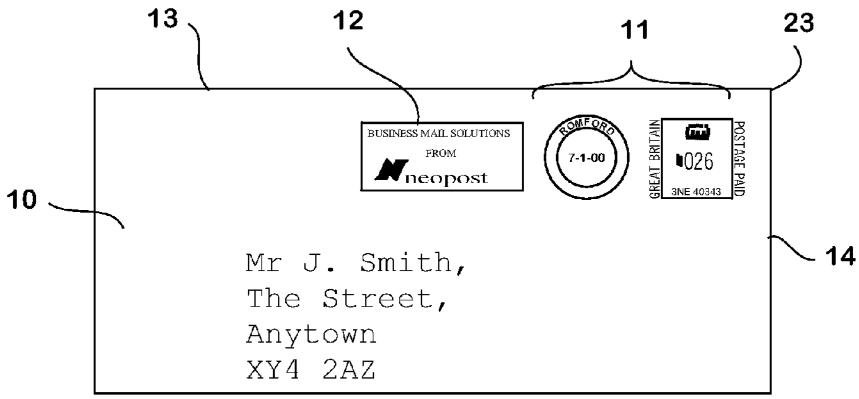
FIG. 1 illustrates a mail piece bearing an imprint of a postal indicium and slogan.

Referring first to FIG. 1, a mail piece 10, comprising an envelope and an insert contained within the envelope, has imprinted thereon a postal indicium 11 and a slogan 12. The postal indicium illustrated is of a form that is currently in use in the United Kingdom for mail pieces handled by Royal Mail. However the postal indicium may be of other forms as authorised by the postal authorities of different countries. In addition to the humanly readable postal indicium, the imprint may include information printed in machine readable form and may include cryptographic information that can be utilised to authenticate the postal indicium imprint. The postage indicium 11 and slogan 12 is printed on the mail piece within an area located at a predetermined position relative to an upper edge 13 and a right hand edge 14 of the mail piece 10.

Figure 2:
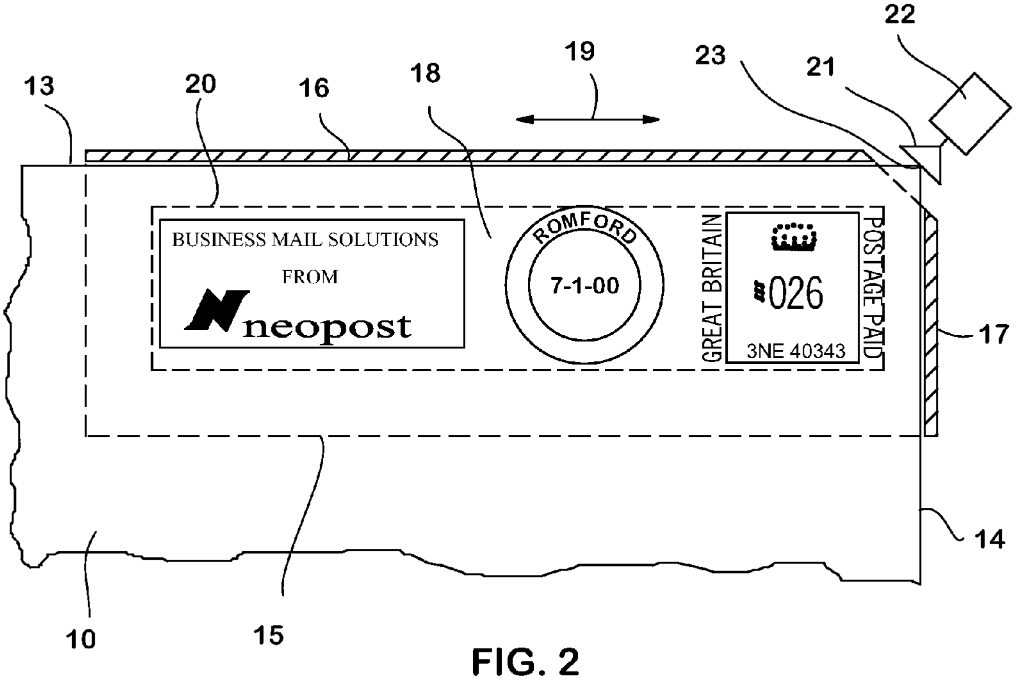
FIG. 2 illustrates the mail piece inserted into a mail receiver of a postage meter after receiving the imprint.

Referring now to FIG. 2 a mail receiver of a postage meter includes a platform 15, indicated by broken line, to support a mail item 10 and guide walls 16, 17. A printer of the postage meter includes a digital print head (not shown in FIG. 2) that is traversed across print field 18 in a direction indicated by arrow 19. A boundary of the print field 18 is indicated by broken line 20. The print field 18 of the printer is located relative to the guide walls 16, 17 such that, when a mail piece 10 is supported on the platform 15 and correctly located to receive an imprint, as shown in FIG. 2 with the upper edge 13 of the mail piece in engagement with the guide wall 16 and the right hand edge 14 of the mail piece in engagement with the guide wall 17, the area of the mail piece in which the postal indicium and the slogan are required to be printed is aligned with the print field 18 and hence will be traversed by the print head. A sensor element 21 of a sensor 22 is located to be engaged by a corner 23 of the mail piece and to be displaced from a position adjacent the guide walls 16, 17, to the position shown in FIG. 2, by the insertion of the mail piece into the correct location to receive an imprint. Displacement of the sensor element 21 to the position shown in FIG. 2 activates the sensor 22 to output an electrical signal to initiate operation of the printer to print a postal indicium and, optionally, a slogan on the mail piece located in the mail receiver of the postage meter.

Figure 3:
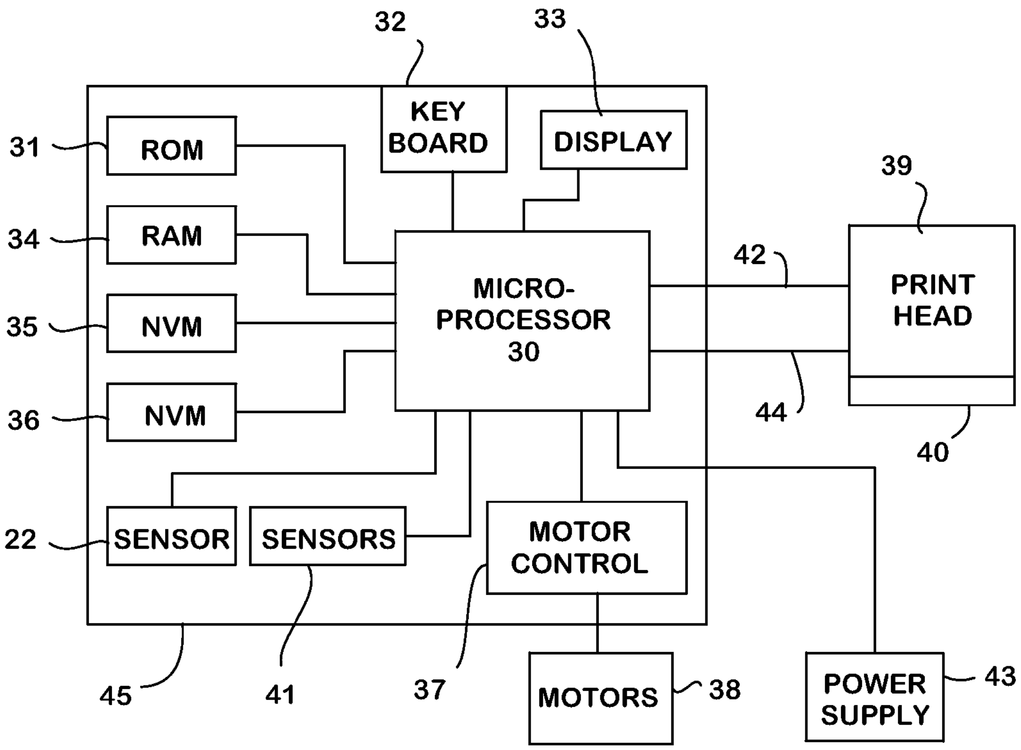
FIG. 3 is a block diagram of a postage meter including a printer for printing an imprint on a print receiving medium.

A block diagram of the postage meter is shown in FIG. 3 to which reference will now be made. The postage meter includes electronic accounting and control means comprising a micro-processor 30 operating under program routines stored in a read only memory (ROM) 31. A keyboard 32 is provided for input of commands and data by a user and a display 33 is provided to enable display of information to the user. A random access memory (RAM) 34 is provided for use as a working store for storage of temporary data during operation of the postage meter. Non-volatile duplicated memories 35, 36 are provided for the storage of critical data relating to use of the postage meter and which is required to be retained even when the postage meter is not powered. The microprocessor 30 carries out accounting functions in relation to use of the postage meter in dispensing postage charges in respect of handling of the mail items by the postal authority or other carrier. Accounting data relating to use of the postage meter in dispensing postage charges in which postal indicia are printed on mail items to provide evidence of accounting for the postage charges and any other critical data to be retained is stored in the non-volatile memories 35, 36. The accounting data includes a value of credit available for use by the meter in franking mail items, an accumulated total of value dispensed by the meter in franking mail items, a count of the number of mail items franked by the meter and a count of the number of mail items franked with a postage charge in excess of a predetermined value. The value of credit is stored in a descending credit register, the accumulated total value is stored in an ascending tote register, the count of items is stored in an items register and the count of items franked with a postage charge in excess of a predetermined value is stored in a large items register. As is well known in the postage meter art, each of the registers referred to hereinbefore for storing accounting data is replicated to enable integrity of the accounting data to be maintained even in the event of a fault or termination of power to the meter during a franking operation. Two replications of each of the registers are provided in each of the memory devices 35, 36. Instead of storing a value of credit available for use in a descending register, an accumulated value of credit entered into the postage meter may be stored in an ascending register.

A motor controller 37 is controlled by the microprocessor to control operation of motors 38 for driving means (not shown) to cause the platform 15 to move between a closed mail clamping position and an open mail release position and for driving means (not shown) to traverse the digital print head over the print field 18. A digital print head is shown in FIG. 3, referenced 39, having a plurality of printing elements disposed in a line 40. The line of printing elements extends transverse to the direction 19 in which the print head is traversed across the print field 18. Operation of the printing elements of the print head 39 is controlled by the microprocessor 30. The digital print head 39 is preferably an ink jet print head in which the line of printing elements comprises a line of ink ejection nozzles. Sensors 41 are provided to sense and monitor the state of the platform 15 and the traversal motion of the print head. The sensors 41 and the sensor 22 provide electrical signals to the microprocessor 30. The sensor, of the sensors 41, that is responsive to traversal motion of the print head provides signals to the microprocessor to enable the microprocessor to selectively energise the print elements of the print head at appropriate times synchronised with the traversal motion of the print head relative to the mail item. During this traversal motion of the print head the microprocessor outputs on line 42, in each of a series of printing cycles, print data signals selecting those ones of the printing elements which are to be energised in each respective printing cycle. A pulse of electrical power is supplied to the selected printing elements from a power source 43 when a strobe signal is supplied by the microprocessor on a line 44 to the print head.

As described hereinbefore, the printing elements are disposed in a line extending transversely to the direction of traversal movement of the print head. Energisation of selected printing elements of the print head in a printing cycle causes deposition of corresponding dots of ink on the mail piece. If the print head is an ink jet print head, energisation of a selected printing element causes a droplet of ink to be ejected through a nozzle onto the mail item.

Because there is traversal movement of the print head relative to the print receiving medium, repeated selection and energisation of selected printing elements in a series of printing cycles results in printing of dots in required positions of a corresponding series of columns spaced along the mail piece in the direction of the traversal movement. Accordingly a complete printed impression of a postal indicium and slogan, as shown in FIG. 2, is formed in a column-by-column manner in the series of printing cycles of a printing operation.

It will be appreciated that, as is well known in the postage meter art, the postage meter must operate in a secure manner and be protected from attempts to use the meter fraudulently for example by utilising the postage meter to print franking impressions on mail items for which no corresponding postage charge has been accounted for by the accounting means. Accordingly those parts of the postage meter required to be secured against unauthorised tampering are housed in a secure housing 45.

In the course of franking and handling mail pieces for delivery to a carrier service, for example a postal authority, there may be a requirement by the carrier service that the user of the postage meter provide a statement or report relating to a batch of mail pieces that have been franked and which is to accompany the batch of mail pieces when delivered to the carrier service or there may be a requirement to provide periodically a report relating to use of the postage meter in dispensing postage charges for mail pieces, for example the report may be required in respect of a period of operation of the postage meter. Typically the period of operation may be a calendar month. The information required to be printed in the report may be generated by the microprocessor 30 from information stored in the register in the non-volatile memories relating to operation of the postage meter and it would be convenient to utilise the printer of the postage meter to print the reports.

It will be appreciated that the dimensions required for the area that is to receive the imprint of the postal indicium and slogan is relatively small and for example is approximately 1 inch in height and 4 inches in width. It is desirable for reasons of economy in manufacture of the postage meter and for compactness of the postage meter that the print field is only of sufficient size as to correspond to the area in which the required postal indicium and slogan is to be printed on the mail pieces. However the quantity of information required to be printed in statements or reports is significantly greater than can be accommodated within the dimensional limits of the print field.

Figure 4:
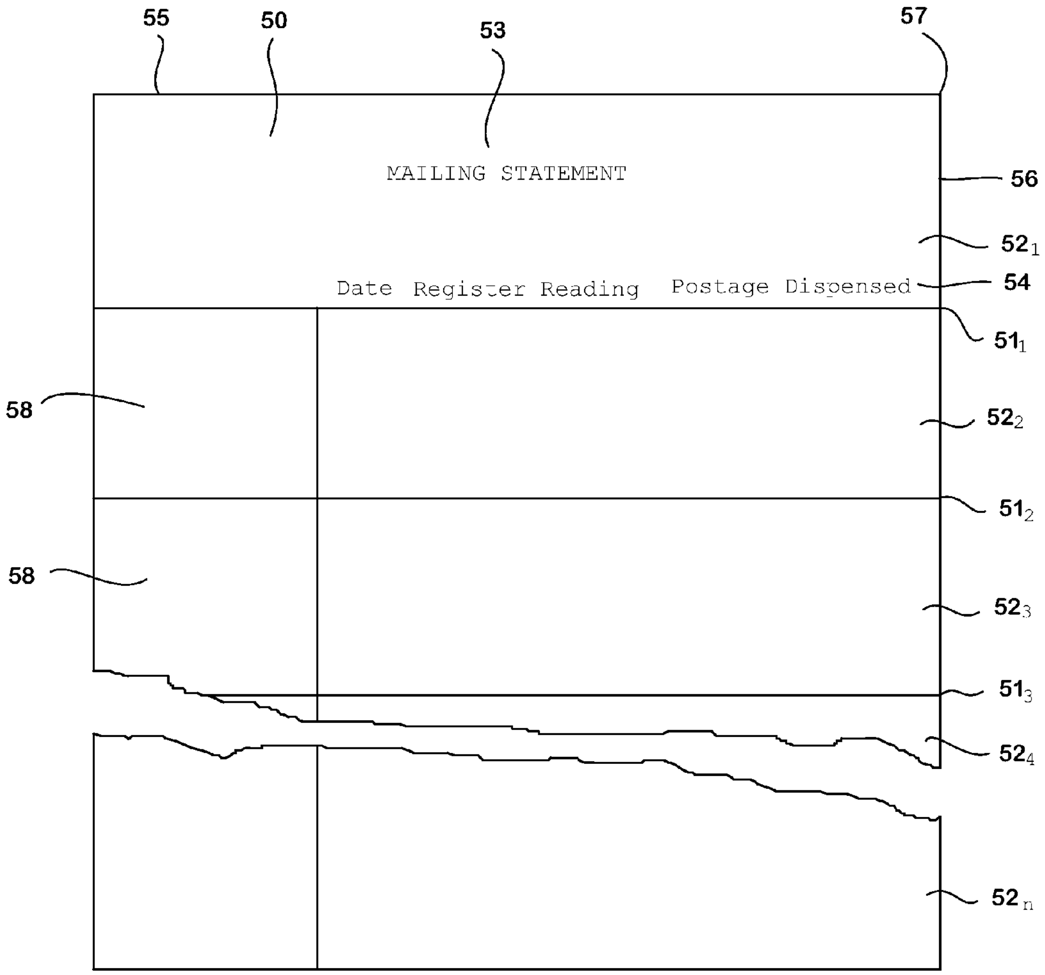
FIG. 4 illustrates a blank report sheet.

Accordingly in order to permit printing of the report, a blank report sheet is provided as shown in FIG. 4. The report sheet 50 is divided by fold lines $\mathbf{51}_1$-$\mathbf{51}_n$, of which only fold lines $\mathbf{51}_1$-$\mathbf{51}_3$ are shown, into a series of segments $\mathbf{52}_1$-$\mathbf{52}_n$ in which information may be printed. The fold lines may be formed as serrations in the paper sheet or the paper sheet may be otherwise weakened or formed so as to ensure that folding of the sheet is easily effected along the fold lines. As shown the segment $\mathbf{52}_1$ comprises a header segment in which heading information, for example a report title 53 and column titles 54, are pre-printed. The pre-printed information in the header segment is information that is invariable and does not change.

When it is desired to print a report sheet, a report sheet printing routine is selected by means of the keyboard 32 of the postage meter. In response to selection of the report sheet printing routine, the microprocessor accesses appropriate registers of the non-volatile memories 35, 36 and reads accounting data from the memories either that is to be printed in the report sheet or from which information to be printed in the report sheet is to generated by the microprocessor 30.

Figure 6:
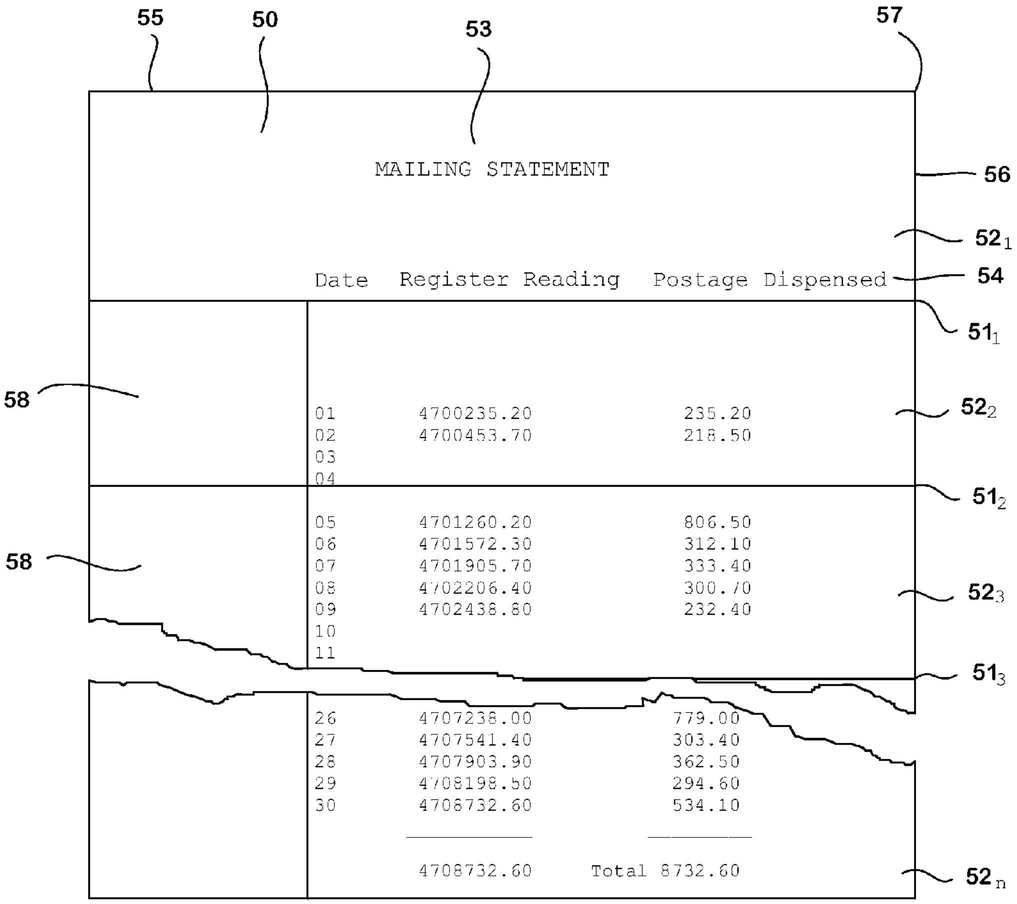
FIG. 5 illustrates the report sheet inserted in the mail receiver of a postage meter and partially printed and FIG. 6 illustrates the report sheet of FIG. 4 printed with mailing information.
Figure 5:
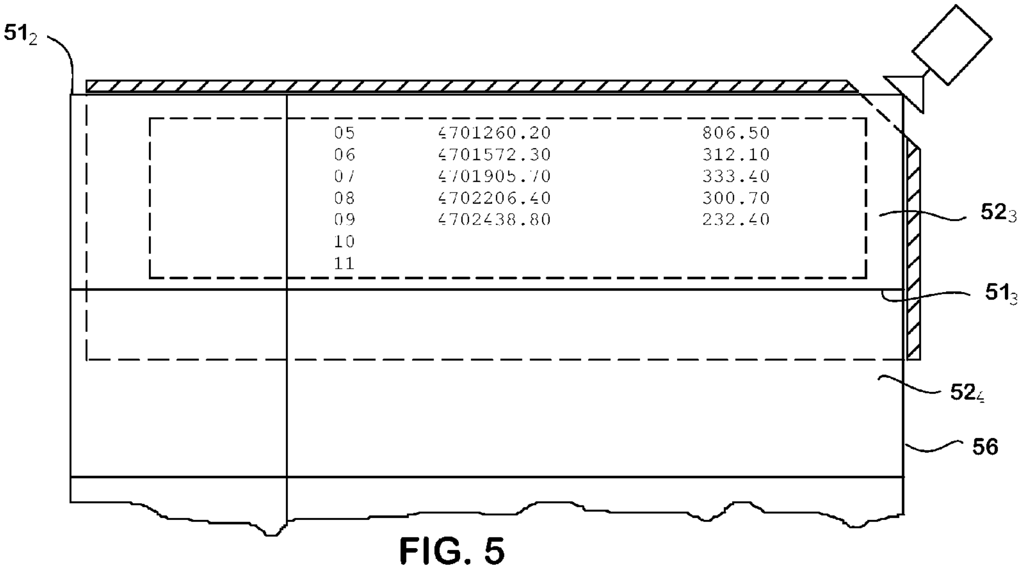

If it is desired to print information in the header segment $\mathbf{52}_1$, instead of or in addition to providing pre-printed information in the header segment, the sheet is inserted into the mail receiver of the postage meter until an upper edge 55 thereof engages the guide wall 16 and a right hand edge 56 thereof engages the guide wall 17. As a result an upper right hand corner 57 engages and displaces the sensor element 20 and the sensor 21 outputs a signal to the microprocessor indicating that the report sheet is correctly located for printing on the header segment $\mathbf{52}_1$. The microprocessor then controls operation of the motor to move the platform 15 from the open state to the closed clamping state thereby to hold the header segment of the report sheet. After clamping of the report sheet has been effected, the print head is traversed across the print field and the microprocessor outputs print data signals to control the print head in a header segment printing operation to print the information required to be printed in the header segment $\mathbf{52}_1$. Upon completion of printing of information in the header segment, the microprocessor operates the motor to move the platform from the closed state to the open state thereby releasing the report sheet and permitting the report sheet to be removed from the mail receiver. The report sheet is then manually folded along the fold line $\mathbf{51}_1$ such that the header segment $\mathbf{52}_1$ lies behind the next segment $\mathbf{52}_2$. The folded report sheet is inserted, with the fold line $\mathbf{51}_1$ leading, into the mail receiver of the postage meter until the fold line $\mathbf{51}_1$ engages the guide wall 16 and the right hand edge 56 of the report sheet engages the guide wall 17. A corner of the folded sheet adjacent the fold line $\mathbf{51}_1$ and the right hand edge 56 engages and displaces the sensor element 20 to initiate a second printing operation in which the folded report sheet is clamped by the platform and the microprocessor outputs print data signals to control operation of the printing elements such as to print required information in the second segment $\mathbf{52}_2$. After completion of printing of the second segment $\mathbf{52}_2$, the platform is moved to the open state to release the report sheet. The report sheet is then un-folded on the fold line $\mathbf{51}_1$, refolded on the fold line $\mathbf{51}_2$ such that the segment $\mathbf{52}_2$ lies behind unprinted segment $\mathbf{52}_3$ and the header segment lies behind unprinted segment $\mathbf{52}_4$. The re-folded report sheet is re-inserted in the mail receiver until the fold line $\mathbf{51}_2$ engages the guide wall 16 and the right hand edge 56 engages the guide wall 17. A third printing operation is initiated in the same manner as the first and second printing operations but in which the microprocessor outputs print data signals to control the printing elements to print information required to be printed in the third segment $\mathbf{52}_3$. FIG. 5 illustrates a partially printed report sheet 50 in the mail receiver of the postage meter, in which the third segment $\mathbf{52}_3$ has been printed and segments $\mathbf{52}_4$ to $\mathbf{52}_n$ have still to be printed. By continued unfolding and refolding the report sheet progressively on the fold lines, successive segments of the report sheet are located in the mail receiver so as to receive imprints of information as described hereinbefore to produce a completely printed report sheet as illustrated in FIG. 6. In the example of report sheet illustrated in FIG. 6, the information printed in the segments $\mathbf{52}_2$-$\mathbf{52}_n$ comprises a series of days of a month and register readings and values of postage dispensed on each of those days.

It will be understood that segments of the report sheet are printed in a series of printing operations in each of which printing operations a selected one of the segments is able to be located to receive an imprint by virtue of the folding of the report sheet along a fold line adjacent the segment to be printed. Conveniently, if seven lines of print can be effected in each printing operation, the format of the information may be such that the information printed in each segment relates to dispensing of postage charges for a period of seven days and the sheet may contain sufficient segments to permit information in respect of dispensing of postage charges during a period of a calendar month to be printed on a single report sheet. However, the printing of the information may be in other formats.

It is to be understood that where all the information to be contained in the header segment $\mathbf{52}_1$ is pre-printed, the first printing operation described hereinbefore in relation to printing in the header segment is omitted and printing of the report sheet starts with folding of the sheet along fold line 51 and printing of the second segment $\mathbf{52}_2$.

In addition to pre-printed information in the header segment, other information may be pre-printed in the other segments. For example a part 58 of the segments at the left hand side of the report sheet may contain pre-printed instructional information to instruct the user in the use of the report sheet, the folding and unfolding thereof and the operation of the postage meter to print the information on the report sheet.

Folding of the report sheet as described hereinbefore permits the segments of the sheet to be located successively in a print receiving position of the mail receiver of the postage meter and thereby permits information to be printed over an area that is of significantly larger extent than the extent of a print field in which a printer is capable of printing and where the construction of the printer prevents feeding of the report sheet relative to the print head.

In addition to permitting printing the segments of the report sheet, the folding of the sheet along the fold lines provides a further benefit in that the folded sheet inserted into the mail receiver has increased rigidity compared with the unfolded sheet and this increased rigidity ensures displacement of the sensor element 20 and consequent operation of the sensor 21. A mail piece comprising an envelope and insert will have a thickness of at least three layers of paper and hence will be relatively rigid. In order to ensure that the sensor element 20 is displaced by insertion of a mail piece but is not displaced accidentally by movement of the postage meter, the sensor element is resiliently urged toward the guide walls 16, 17 by a spring force which can be overcome by insertion of a mail piece having at least expected thickness and rigidity but which retains the sensor element at other times. The report sheet comprises a single thickness of paper and hence the rigidity of the report sheet may be insufficient to overcome the spring force acting on the sensor element. However the folded report sheet has increased rigidity compared with the unfolded sheet and hence is capable of overcoming the spring force acting of the sensor element. Accordingly a lighter weight paper may be used for the report sheet than if the report sheet is of single thickness where inserted into the mail receiver of the postage meter. If it is desired to print on the header section of a report sheet of light weight paper, increased rigidity may be provided by providing an additional segment above the header segment which additional segment is folded to lie behind the header section during insertion and printing of the header section.

I claim:

1. A method of printing in an area of a sheet using a printer of a postage meter, the printer having a limited print field smaller than the area required to be printed on the sheet and in which two adjacent edges of the sheet are required to be located at predetermined first and second locations respectively relative to the print field, comprising:

the steps in a first printing operation of (a) positioning the sheet with a first edge thereof located at the first predetermined location and a second edge thereof located at the second predetermined location, thereby locating a first print receiving sub-area of a first segment of the sheet in alignment with the print field, (b) effecting printing in the first print receiving sub-area, and (c) removing the sheet from the postage meter; and the steps in a second printing operation of (d) folding the sheet along a fold line extending between the first segment and a second segment adjacent to the first segment, (e) positioning the sheet with the fold line located at the first predetermined location and the second edge located at the second predetermined location, thereby locating a second print receiving sub-area of the second segment in alignment with the print field, and (f) effecting printing in the second print receiving sub-area.

2. A method as claimed in claim 1, wherein the sheet includes a pre-printed header segment adjacent and connected to the first segment by a header fold line, and the first edge comprises the header fold line.

3. A method as claimed in claim 1, wherein printing on the sheet includes a series of printing operations in each of which printing operations the sheet is folded along a selected fold line, and printing is effected in a segment of the sheet adjacent the selected fold line, and after printing the sheet is unfolded.

4. A method as claimed in claim 1, wherein the sheet includes a plurality of first segments, adjacent first segments being connected along first segment fold lines, and printing on each of the first segments of the plurality of first segments comprises the steps of the first printing operation.

5. A method as claimed in claim 3, wherein the sheet includes a plurality of first segments, adjacent first segments being connected along first segment fold lines, and printing on each of the first segments of the plurality of first segments comprises the steps of the first printing operation.

* * * * *